(12) United States Patent
Asfar (10) Patent No.: US 10,385,828 B2
(45) Date of Patent: Aug. 20, 2019

(54) ADJUSTABLE DUAL ROTOR WIND TURBINE

(71) Applicant: Jordan University of Science and Technology, Irbid (JO)

(72) Inventor: Khaled Rafiq Asfar, Irbid (JO)

(73) Assignee: JORDAN UNIVERSITY OF SCIENCE AND TECHNOLOGY, Irbid (JO)

( * ) Notice: Subject to any disclaimer, the term of this patent is extended or adjusted under 35 U.S.C. 154(b) by 257 days.

(21) Appl. No.: 15/454,265

(22) Filed: Mar. 9, 2017

(65) Prior Publication Data
US 2017/0292497 A1    Oct. 12, 2017

Related U.S. Application Data

(60) Provisional application No. 62/319,546, filed on Apr. 7, 2016.

(51) Int. Cl.
| F03D 15/00 | (2016.01) |
| F03D 1/02  | (2006.01) |
| F03D 17/00 | (2016.01) |

(52) U.S. Cl.
CPC ............ *F03D 15/00* (2016.05); *F03D 1/025* (2013.01); *F03D 17/00* (2016.05); *F05B 2240/221* (2013.01); *F05B 2240/2213* (2013.01); *F05B 2240/60* (2013.01); *F05B 2260/4023* (2013.01); *F05B 2270/20* (2013.01); *F05B 2270/335* (2013.01); *Y02E 10/725* (2013.01)

(58) Field of Classification Search
CPC . F03D 15/00; F03D 1/025; F03D 1/02; F03D 17/00; F03D 7/00; F03D 7/02; F03D 80/82; Y02E 10/725; F05B 2240/2213; F05B 2240/60; F05B 2240/221; F05B 2270/335; F05B 2270/20; F05B 2260/4023; F05B 2220/706; F05B 2250/311; F05B 2260/40311; F05B 2270/101
USPC .......... 415/4.1, 4.3, 4.5, 123, 143, 905, 908; 416/169 R, 170 R, 175, 198 R, 201 R, 416/169 A, 203; 700/286, 287
See application file for complete search history.

(56) References Cited

U.S. PATENT DOCUMENTS

| 5,506,453 A * | 4/1996 | McCombs ............. F03D 1/025 |
|               |        | 290/44                           |
| 5,876,181 A * | 3/1999 | Shin ..................... F03D 1/06 |
|               |        | 415/2.1                          |
| 6,856,042 B1* | 2/2005 | Kubota .................. F03D 1/025 |
|               |        | 290/55                           |

(Continued)

FOREIGN PATENT DOCUMENTS

GB        2347178        8/2000

*Primary Examiner* — Nathan C Zollinger
(74) *Attorney, Agent, or Firm* — Matheson Keys & Kordzik PLLC; Kelly Kordzik (57) ABSTRACT

A dual rotor axis wind turbine that converts renewable energy into electrical energy. The dual rotor wind turbine addresses the counter productivity problem found in dual rotors wind turbines, which occurs due to adverse effects to the downwind rotor due to lying in the wake of the upwind rotor. The dual rotors lie on an axis with a relative angular displacement between the blades of such rotors, wherein the relative angular displacement is adjustable in order for the downwind rotor to avoid the counterproductive wake of the first rotor.

19 Claims, 4 Drawing Sheets

(56) References Cited

U.S. PATENT DOCUMENTS

| | | | | |
|---|---|---|---|---|
| 7,384,239 B2* | 6/2008 | Wacinski | ............... | F03D 1/025 |
| | | | | 416/128 |
| 7,923,854 B1* | 4/2011 | Meller | ................... | F03D 1/025 |
| | | | | 290/55 |
| 7,946,157 B2* | 5/2011 | Habets | ................... | F03D 7/028 |
| | | | | 73/112.01 |
| 8,178,991 B2* | 5/2012 | Smith | ................. | F03D 1/0608 |
| | | | | 290/55 |
| 8,454,313 B2* | 6/2013 | Elkin | ..................... | F03D 1/025 |
| | | | | 416/132 B |
| 8,664,794 B2* | 3/2014 | Bitar | ...................... | F03D 1/025 |
| | | | | 290/55 |
| 8,772,958 B2* | 7/2014 | Kang | .................... | F03D 1/025 |
| | | | | 290/55 |
| 8,836,158 B2* | 9/2014 | Cho | ........................ | H02P 9/04 |
| | | | | 290/55 |
| 9,709,027 B1* | 7/2017 | Al-Hawaj | .............. | F03D 1/025 |
| 2004/0096327 A1* | 5/2004 | Appa | .................... | F03D 1/025 |
| | | | | 416/1 |
| 2009/0223307 A1* | 9/2009 | Staedler | ............... | F03D 7/0248 |
| | | | | 73/862.09 |
| 2010/0215502 A1* | 8/2010 | Harrison | ................ | F03D 1/025 |
| | | | | 416/205 |
| 2011/0163552 A1* | 7/2011 | Zhang | ................... | F03D 1/025 |
| | | | | 290/55 |
| 2014/0021722 A1* | 1/2014 | Jakubaszek | ........... | F03B 17/061 |
| | | | | 290/55 |
| 2015/0115614 A1* | 4/2015 | Smith | ................... | F03D 1/025 |
| | | | | 290/1 C |

* cited by examiner

ADJUSTABLE DUAL ROTOR WIND TURBINE

This application claims priority to U.S. Provisional Patent Application Ser. No. 62/319,546.

TECHNICAL FIELD

The present invention relates in general to wind turbines, and particularly to a dual rotor wind turbine having adjustable relative displacement between the rotors' blades designed for increasing the productivity of the wind turbines.

SUMMARY

Aspects of the present disclosure provide an adjustable dual rotor wind turbine in which the relative angular displacement between the front and rear rotor blades is automatically adjusted to prevent the rotors from harvesting any counterproductive wake, and to increase the output power.

Aspects of the present disclosure provide a dual rotor wind turbine with automatically adjustable relative angular displacement between the respective blades of the two rotors.

Aspects of the present disclosure provide an adjustable dual rotor wind turbine with increased power efficiency.

Aspects of the present disclosure provide an adjustable dual rotor wind turbine in which the blades of a first rotor are effectively removed from the wake of a second rotor.

Aspects of the present disclosure provide an adjustable dual rotor wind turbine that harnesses the Venturi effect for improving the performance of such turbine (i.e., the electrical output).

Aspects of the present disclosure provide an adjustable dual rotor wind turbine including a first rotor with a first set of blades, a second rotor with a second set of blades, a first shaft coupled to the first rotor, a second shaft coupled to the second rotor, and a mechanism coupled to the first and second shafts for adjusting the relative angular displacement between the first and second rotors. The mechanism for adjusting the relative angular displacement between the first and second rotors includes at least one clutch disc coupled to the first shaft, and a flywheel coupled to the second shaft. The adjustable dual rotor wind turbine includes an actuation mechanism for engaging and disengaging the clutch disc and the flywheel, wherein the first and second rotors are free to rotate relative to each other when the at least one clutch disc and the flywheel are disengaged, and the first and second rotors are fixed relative to each other When the at least one clutch disc and the flywheel are engaged. The actuation mechanism includes a solenoid coupled to the clutch disc. A controller signals the activation and deactivation of the solenoid according to a value corresponding to the electrical output power produced by the wind turbine, wherein the value may be measured by a power meter.

Aspects of the present disclosure provide an adjustable dual rotor wind turbine including a first rotor with a first set of blades, a second rotor with a second set of blades, a first shaft coupled to the first rotor, a second shaft coupled to the second rotor, a gearbox operatively connected to the first shaft and a third shaft, and a mechanism coupled to the first and second shafts for adjusting the relative angular displacement between the first and second rotors. The mechanism for adjusting the relative angular displacement between the first and second rotors includes at least one clutch disc coupled to the first shaft, and a flywheel coupled to the second shaft. The adjustable dual rotor wind turbine includes an actuation mechanism for engaging and disengaging the at least one clutch disc and the flywheel, wherein the first and second rotors are free to rotate relative to each other when the at least one clutch disc and the flywheel are disengaged, and the first and second rotors are fixed relative to each other when the at least one clutch disc and the flywheel are engaged. The actuation mechanism includes a solenoid coupled to the clutch disc. The controller signals the activation and deactivation of the solenoid according to a value corresponding to the electrical output power produced by the wind turbine, wherein the value may be measured by a power meter.

Aspects of the present disclosure provide a control process for an adjustable dual rotor wind turbine, including signaling the actuation mechanism to engage the mechanism for adjusting the relative angular displacement between the first and second rotors, measuring an output power of the adjustable dual rotor wind turbine, repeating such a measurement if the measured power is greater than a threshold power, signaling the actuation mechanism if the measured power was less than a threshold power to disengage the mechanism for adjusting the relative angular displacement between the first and second rotors, waiting a period of time, and signaling the actuation mechanism to control the mechanism for adjusting the relative angular displacement between the first and second rotors.

In accordance with aspects of the present disclosure, the threshold power may be predetermined by a user.

In accordance with aspects of the present disclosure, the period of time may be preselected by a user.

BRIEF DESCRIPTION OF THE DRAWINGS

Aspects of the present disclosure will now be described with reference to the accompanying drawings, which illustrate embodiments of the present disclosure without restricting the scope of the invention, and in which.

2 illustrates a cross-sectional view of an adjustable dual rotor wind turbine taken perpendicular to the longitudinal direction of the dual rotors, configured in accordance with aspects of the present disclosure.

DETAILED DESCRIPTION

Wind turbines convert wind energy into electrical energy, but they are known for their relatively low efficiency.

A dual rotor turbine can include a planetary gearbox having two inputs, each connected to a corresponding rotor, and one output connected to a generator, wherein the rotational speed of the one output is determined as a result of the relative rotational speed of the two rotors. The two rotors rotate in opposite direction to each other, and the pitch angle of rotor blades may be altered using a control system.

An alternative dual rotor turbine for converting wind energy into electrical energy can include in combination a housing, blades at the forward and rearward ends of the housing mounted on shafts for rotation upon a common horizontal axis of rotation, post means supporting a central extent of the housing for rotation in a horizontal plane to face into the wind, an alternator within the housing formed of a power take off member coupled to one shaft and a rotor coupled to another shaft for counter rotating when the blades rotate for thereby generating electricity, centrifugal pitch control mechanisms for varying the pitch of the blades as a function of the propeller speed, transmission mechanisms for varying the speed of rotation of the rotor and power take off member as a function of the wind speed, brake mechanisms for proportionately restraining the blades against rotation, and an aero governor operatively coupled with the brake mechanisms for control thereof in response to the speed of the wind as determined by the aero governor.

Another alternative wind turbine has first and second rotors mounted on a common horizontal axis on a tower. The rotors rotate in the same direction and drive an electrical generator by a fluid or belt. Alternatively, the electrical generator may be positioned between the rotors, at the top of the tower. Means determines the wind direction and strength to enable a shaft to be rotated about an upright axis so the rotors face the wind. The rotors have blades, the blades of the front rotor being shorter than the rear blades by up to 75%.

Another alternative dual rotor wind turbine includes a rotatable drive shaft, a first rotor assembly connected to the drive shaft, a second independently-rotating rotor assembly coupled to the drive shaft rearward of the first rotor assembly, a first stage generator coupled to the drive shaft, a second stage generator operatively connected to the second rotor assembly, a housing wherein the generators are situated, a rotary base, and a tail. In use, the rotary base allows the tail to optimally position the rotors for collecting wind. Wind rotates the first rotor assembly, causing the drive shaft to rotate and operate the first stage generator. Wind passing through and directed off the first rotor assembly rotates the second rotor assembly, independent of the first rotor assembly, operating the second stage generator.

The foregoing wind turbines do not have high efficiencies since the blades of the rear rotor (the rotor positioned downwind from the front rotor) lie in the wake of the blades of the front rotor, and thus adversely affect the operation of the blades of the rear rotor.

FIGS. 1-4 illustrate an adjustable dual rotor wind turbine configured in accordance with embodiments of the present disclosure. Such embodiments include a tower 1; two similar rotors 11 and 12 with similar sets of blades, in which a plurality of blades 2 are mounted on the first rotor 11, and a plurality of blades 20 are mounted on the second rotor 12; and the first rotor 11 mounted onto a first shaft 3, with the second rotor 12 mounted onto a second shaft 30. Embodiments of the present disclosure may also include a gearbox 4, a third shaft 13 operatively connecting the gearbox 4 with a mechanism 7 for adjusting the relative angular displacement between the two rotors, an electrical generator 5, a swivel joint 6, a controller 9, and an electrical power meter 8. In accordance with aspects of the present disclosure, the shafts 3 and 30, the gearbox 4, the generator 5, the mechanism 7 for adjusting the relative angular displacement between the two rotors, the third shaft 13, the controller 9, and the electrical power meter 8 are housed within an upper housing assembly 10.

Figure 1:
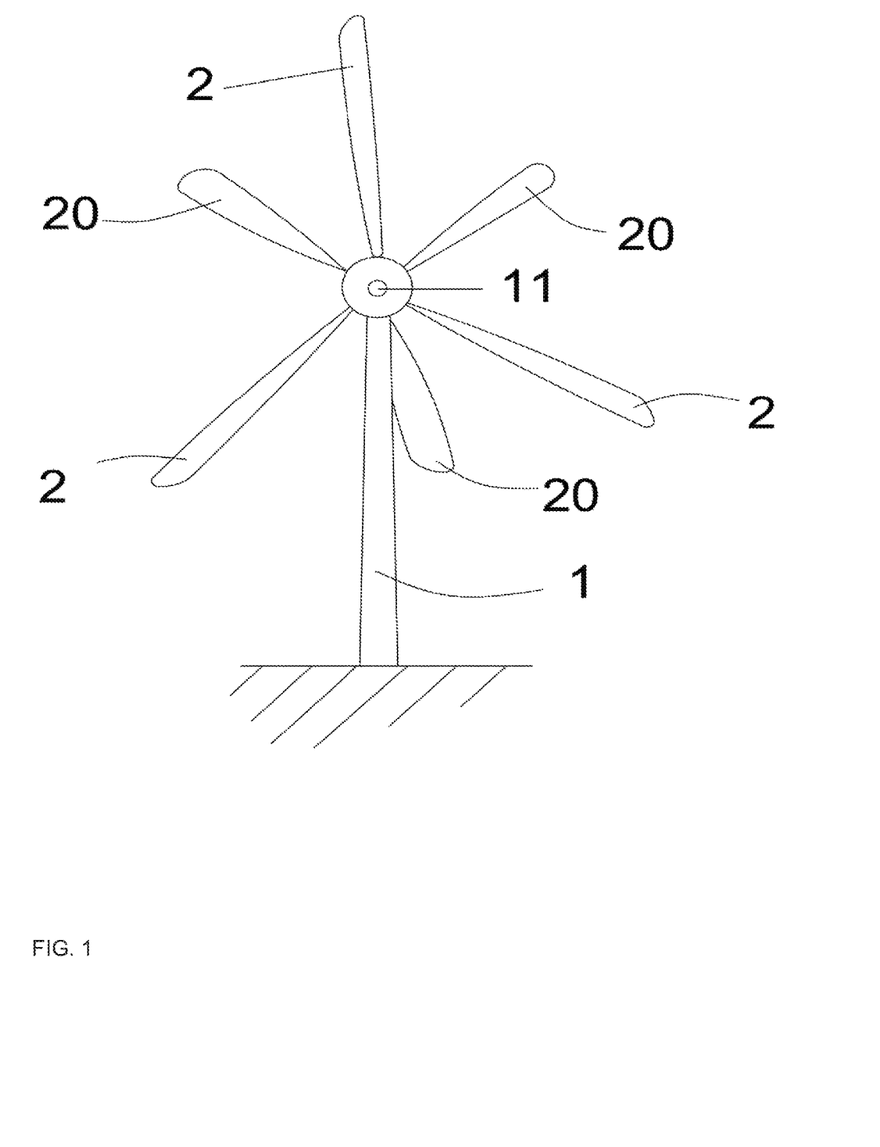
FIG. 1 illustrates a front view of an adjustable dual rotor wind turbine configured in accordance with aspects of the present disclosure.
Figure 2:
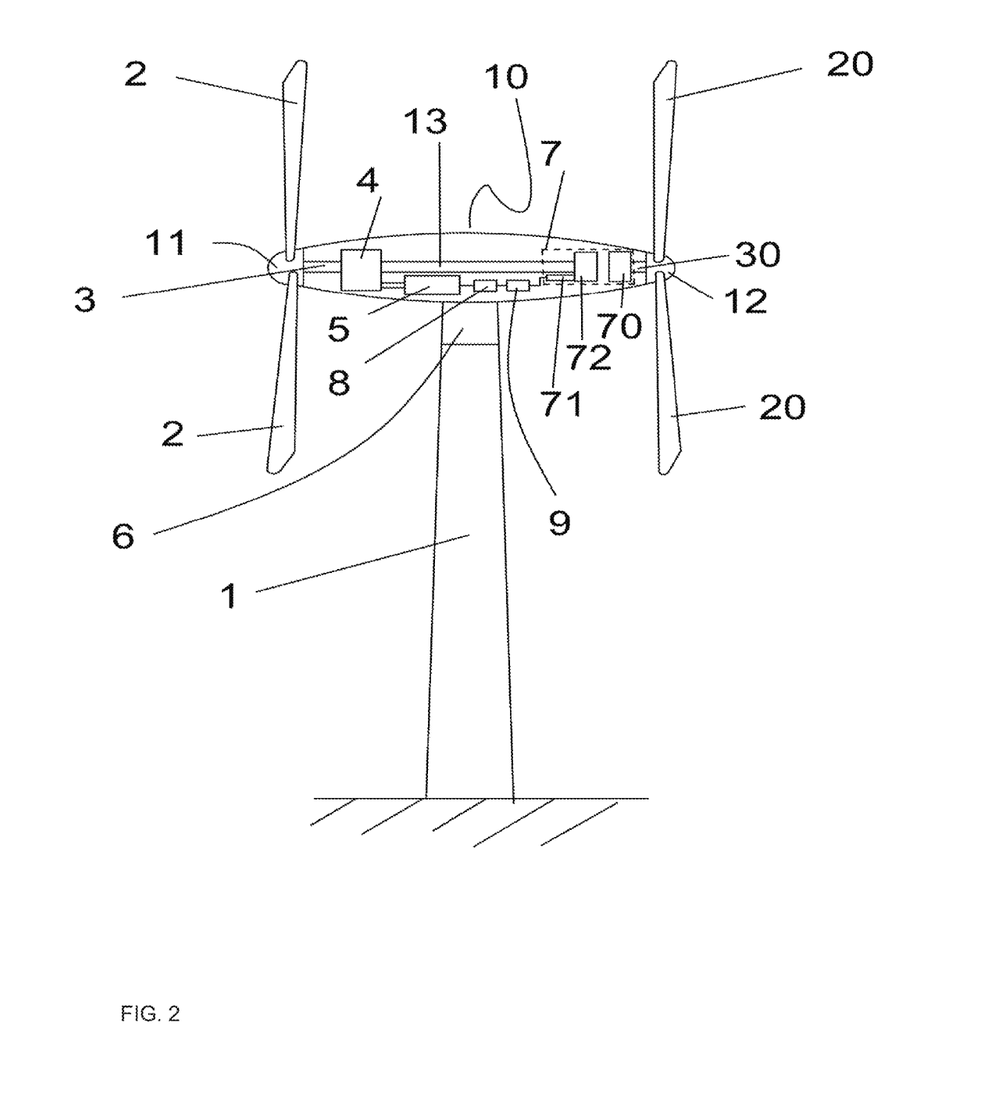
Figure 3:
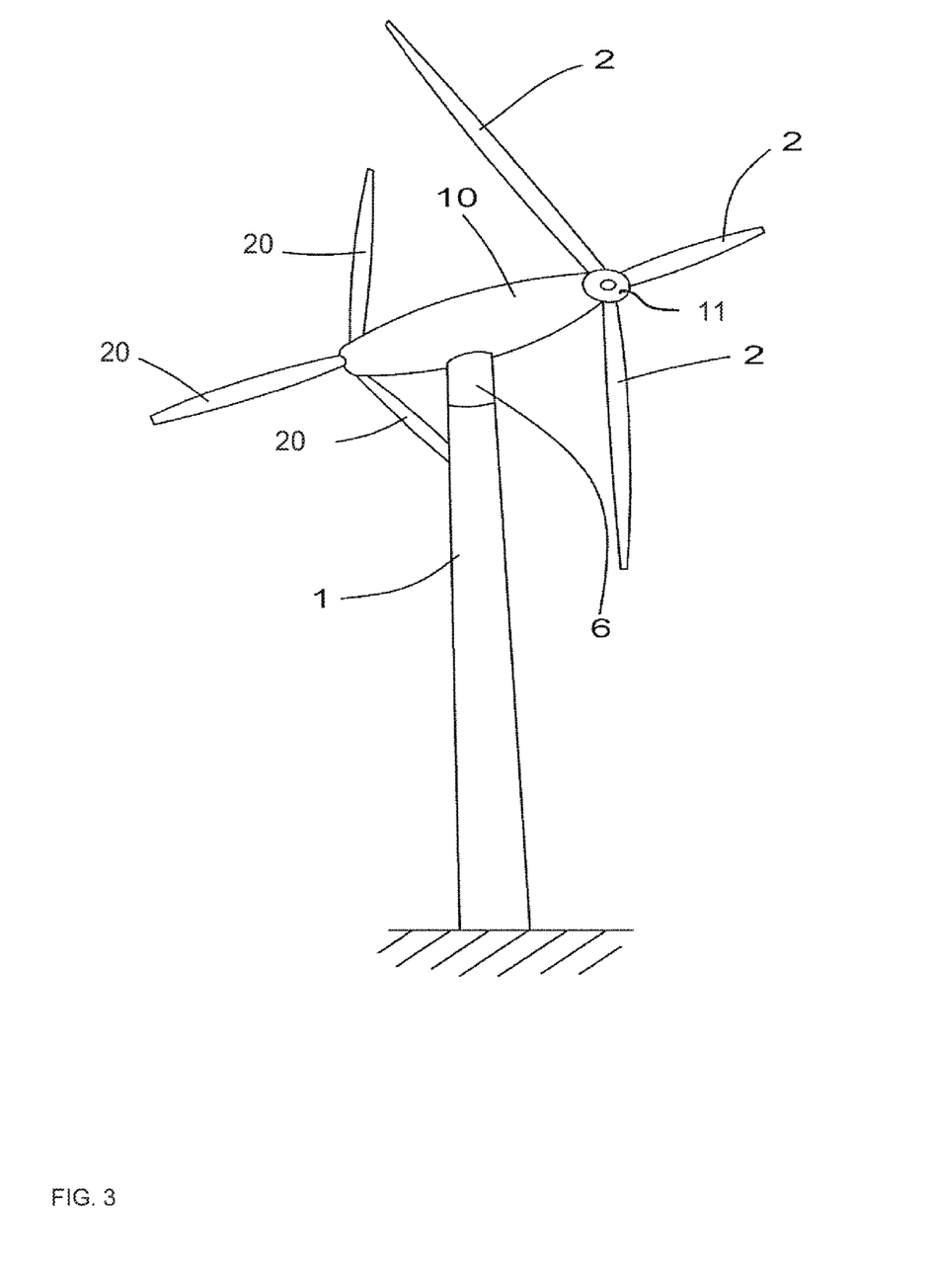
FIG. 3 illustrates a perspective view of an adjustable dual rotor wind turbine configured in accordance with aspects of the present disclosure.

In accordance with aspects of the present disclosure, each of the rotors 11 and 12 has a plurality of blades (for example, two, three, four, or more blades), and such rotors may he mounted onto the upper assembly 10 in a substantially collinear configuration pointing towards opposite directions from each other. The gearbox 4 may be operatively connected to the shaft 3 and to the electrical generator 5 such that the gearbox 4 provides speed and torque conversions of the rotors 11 and 12. The swivel joint 6 enables any suitable adjustment in the rotors' orientation (and correspondingly, the upper assembly 10) in order for one of the sets of the blades 2 and 20 to face the wind direction. Any well-known mechanism for performing such a function may be utilized for the swivel joint 6. The power meter 8 may be operatively connected to the electrical generator 5, wherein the power meter 8 measures the value of the electrical power produced by the electrical generator 5.

Referring to FIG. 2, in accordance with aspects of the present disclosure, the mechanism 7 for adjusting the relative angular displacement between the rotors 11 and 12 may include a flywheel 70 coupled to the second shaft 30 and at least one clutch disc 72 coupled to the third shaft 13, wherein such at least one clutch disc 72 automatically engages and disengages with the flywheel 70 using any suitable actuation mechanism 71, as further described herein. Engaging and disengaging of the flywheel 70 and at least one clutch disc 72 may be performed by the actuation mechanism for various reasons (for example, when the output power of the turbine (e.g., as measured by the power meter 8) is less than a predetermined level, as is further described herein). (The illustration in FIG. 2 shows the flywheel 70 and the at least one clutch disc 72 disengaged; however, one skilled in the art would appreciate how an illustration would show these engaged.) When the at least one clutch disc 72 and the flywheel 70 disengage from each other, the rotors 11 and 12 become free to rotate relative to each other. Because of various factors, such as friction, relative force of the wind currents, etc., the relative angular displacement between the rotors 11 and 12, and correspondingly the two sets of blades 2 and 20, will change during the period of time that their two respective rotors 11 and 12 are permitted to freely rotate relative to each other, and before the at least one clutch disc 72 and the flywheel 70 re-engage with each other. As a result, after re-engaging with each other, the angular positioning of the blades 2 will have changed relative to the angular positioning of the blades 20, which can affect the level of the wake emanating from the upwind set of blades towards the downwind set of blades, and thus affect the power generating efficiency of the combined output of the two sets of blades.

Embodiments of the present disclosure are not limited to the specific configuration of the mechanism 7 disclosed herein. Instead, any configuration suitable for engaging and disengaging the two rotors from each other, and for adjusting the relative angular displacement between the two rotors may be utilized. For example, instead of a flywheel and clutch disc, an arrangement of gears and/or a fluidic coupling mechanism (e.g., a torque converter such as used in automatic transmissions) may be utilized. Nevertheless, when the two rotors are engaged, their relative angular displacement relative to each other is substantially zero, meaning that the two rotors (and consequently, their respective blades) rotate substantially in sync with each other.

In accordance with embodiments of the present disclosure, the adjustable wind turbine may be a gearless (e.g., direct drive) wind turbine, wherein the first shaft 3 may be operatively connected to the electrical generator 5 and the flywheel 70. Any well-known mechanisms for performing the connection function of the first shaft 3 to the electrical generator 5 and the flywheel 70 may be utilized.

Figure 4:
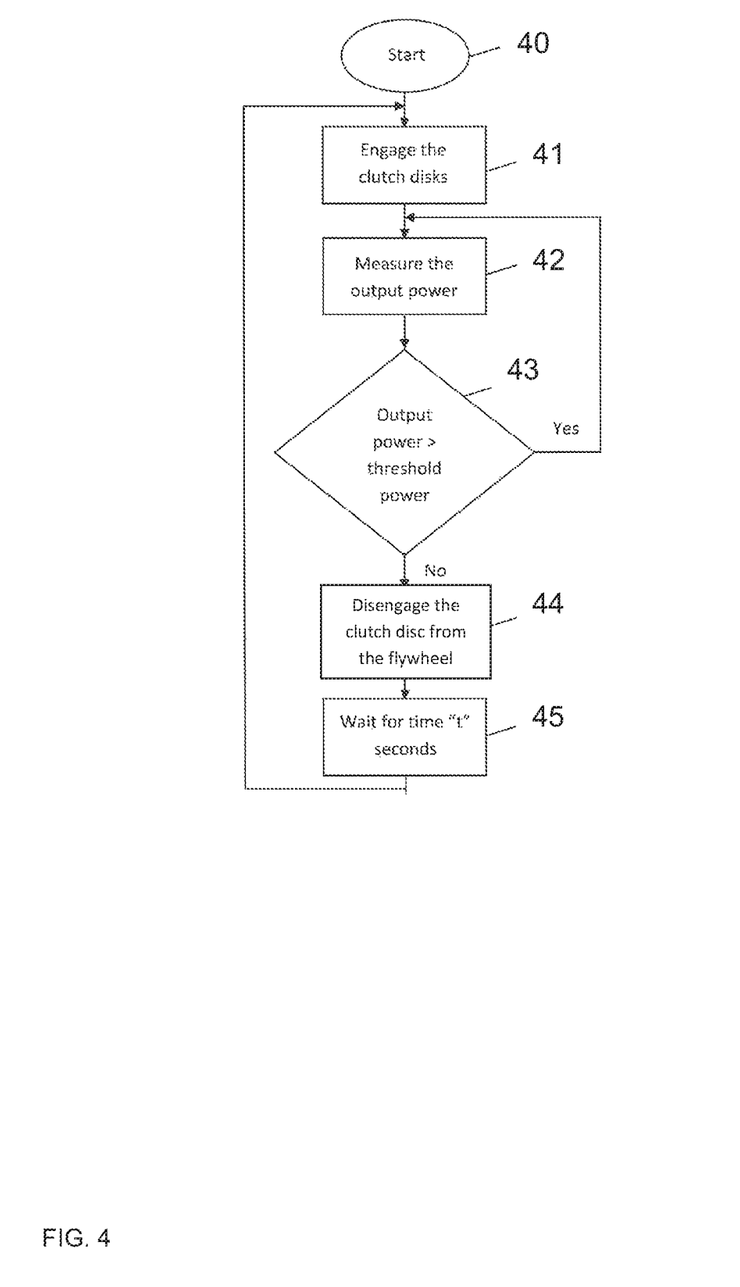
FIG. 4 illustrates a flow chart of a control process of an adjustable dual rotor wind turbine configured in accordance with aspects of the present disclosure.

A control process for modifying the relative angular displacement between the rotors 11 and 12 in the adjustable dual rotor wind turbine of the present disclosure is illustrated in FIG. 4 and may be implemented in hardware and/or software in the controller 9. The process starts (process block 40) with the controller 9 signaling the actuation mechanism 71 to engage the two rotors together (for example, by bringing in physical contact together the at least one clutch disc 72 and the flywheel 70 (process block 41)). The output power generated by the electrical generator 5 as a result of the combined rotation of the engaged together rotors 11 and 12 of the wind turbine may be measured using the electrical power meter 8 (process block 42). Then, if the measured power is greater than a predetermined threshold value (process block 43), measurement of the output power is repeated in a loop (process block 42). But, if during this process loop, the measured power is less than a threshold power (process block 43), the controller 9 signals the actuation mechanism 71 to disengage the two rotors from each other (process block 44) (for example, by disengaging the clutch disc 72 from the flywheel 70) in order to permit a change to occur in the relative angular displacement between the rotors 11 and 12, and consequently their respective sets of blades 2 and 20. After a predetermined time of "t" seconds (process block 45), the controller 9 signals the actuation mechanism 71 to re-engage the two rotors to each other (process block 41) (for example, by re-engaging the at least one clutch disc 72 and the flywheel 70 to each other), and the process is repeated in a loop.

In accordance with aspects of the present disclosure, the actuation mechanism 71 for engaging and disengaging the at least one clutch disc 72 and the flywheel 70 may include a solenoid 71 coupled to the at least one clutch disc 72 using any well-known mechanism for performing such a connection. When the solenoid 71 is actuated by a signal received from the controller 9, the at least one clutch disc 72 is linearly displaced from a default position towards a physical (e.g., frictional) engagement with the flywheel 70. When the solenoid 71 is deactivated, the at least one clutch disc 72 is disengaged from the flywheel 70 and returns to the default position.

In accordance with aspects of the present disclosure, the controller 9 may include a microcontroller.

In accordance with aspects of the present disclosure, the amount of time "t" may be preprogrammed on the microcontroller.

The swivel joint 6 in aspects of the present disclosure may connect between the tower 1 and the upper assembly 10, wherein such joint 6 gives the upper assembly 10 two degrees of freedom relative to said tower 1, Wherein such degrees of freedom enable the blades to face the wind direction in order to increase the efficiency of the dual rotor wind turbine. The two degrees of freedom may include a horizontal rotation of the upper assembly 10 about the tower 1, and/or a vertical tilt of the upper assembly 10 with respect to the tower 1.

Aspects of the present disclosure can harness the Venturi effect caused by the partial blockage of the air stream by the first rotor blades 2, which reduces the wind pressure and increases the velocity of the wind, thus the power generated by the wind turbine is increased.

In accordance with aspects of the present disclosure, the threshold power may be preprogrammed on the controller 9 such that the maximum power is greater than the maximum power that could be generated when the second rotor lies in the wake of the first rotor.

The following example illustrates embodiments of the present disclosure without, however, limiting the same thereto. A small scale model made in accordance with embodiments of the present disclosure was positioned in front of a wind tunnel, and the maximum power generated by such model was 210% of the power generated by a single rotor wind turbine of the same scale.

While the invention has been described in details and with reference to a specific embodiment thereof, it will be apparent to one skilled in the art that various additions, omissions, and modifications can be made without departing from the spirit and scope thereof.

Although the above description contains some specificity, these should not be construed as limitations on the scope of the invention, but is merely representative of the disclosed aspects of the present disclosure.

As used herein, the singular forms "a," "an," and "the" include plural referents unless the context clearly dictates otherwise.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, "significance" or "significant" relates to a statistical analysis of the probability that there is a non-random association between two or more entities. To determine whether or not a relationship is "significant" or has "significance," statistical manipulations of the data can be performed to calculate a probability, expressed as a "p value." Those p values that fall below a user-defined cutoff point are regarded as significant. In some embodiments, a p value less than or equal to 0.05, in some embodiments less than 0.01, in some embodiments less than 0.005, and in some embodiments less than 0.001, are regarded as significant. Accordingly, a p value greater than or equal to 0.05 is considered not significant.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Any steps recited in any method or process claims may be executed in any order and are not limited to the order presented in the claims. Means-plus-function or step-plus function limitations will only be employed where for a specific claim limitation all of the following conditions are present in that limitation: a) "means for" or "step for" is expressly recited; and b) a corresponding function is expressly recited. The structure, material, or acts that support the means-plus function are expressly recited in the description herein, Accordingly, the scope of the invention should be determined solely by the appended claims and their legal equivalents, rather than by the descriptions and examples given herein.

The invention claimed is:

1. An adjustable dual rotor wind turbine comprising:
a first rotor with a first set of blades;
a second rotor with a second set of blades;
a first shaft coupled to the first rotor;
a second shaft coupled to the second rotor; and
a mechanism, coupled to the first and second shafts, configured to adjust a relative angular displacement between the first and second rotors, wherein said mechanism is configured to adjust the relative angular displacement between the first and second rotors as a function of a measured output power generated as a result of a combined rotation of the first and second rotors.

2. The adjustable dual rotor wind turbine of claim 1, wherein said mechanism configured to adjust the relative angular displacement between the first and second rotors comprises at least one clutch disc coupled to the first shaft, and a flywheel coupled to the second shaft.

3. The adjustable dual rotor wind turbine of claim 1, wherein a controller is configured to signal a solenoid associated with the mechanism to be activated and deactivated according to a value of electrical output power produced by the wind turbine, wherein the value is measured by a power meter.

4. An adjustable dual rotor wind turbine comprising:
a first rotor with a first set of blades;
a second rotor with a second set of blades;
a first shaft coupled to the first rotor;
a second shaft coupled to the second rotor;
a mechanism, coupled to the first and second shafts, configured to adjust a relative angular displacement between the first and second rotors, wherein said mechanism configured to adjust the relative angular displacement between the first and second rotors comprises at least one clutch disc coupled to the first shaft, and a flywheel coupled to the second shaft; and
an actuation mechanism configured to physically engage and disengage the clutch disc and the flywheel from each other, wherein the first and second rotors are free to rotate relative to each other when the at least one clutch disc and the flywheel are disengaged, and wherein rotations of the first and second rotors are fixed relative to each other when the at least one clutch disc and the flywheel are engaged.

5. An adjustable dual rotor wind turbine comprising:
a first rotor with a first set of blades;
a second rotor with a second set of blades;
a first shaft coupled to the first rotor;
a second shaft coupled to the second rotor;
a mechanism, coupled to the first and second shafts, configured to adjust a relative angular displacement between the first and second rotors; and
an actuation mechanism configured to engage and disengage the first and second rotors from each other, wherein the first and second rotors are free to rotate relative to each other when the actuation mechanism is configured so that the first and second rotors are disengaged from each other, and wherein rotations of the first and second rotors are fixed relative to each other when the actuation mechanism is configured so that the first and second rotors are engaged with each other, wherein when the actuation mechanism is configured so that the first and second rotors are disengaged from each other, the relative angular displacement between the first and second rotors changes.

6. An adjustable dual rotor wind turbine comprising:
a first rotor with a first set of blades;
a second rotor with a second set of blades;
a first shaft coupled to the first rotor;
a second shaft coupled to the second rotor;
a gearbox operatively connected to the first shaft and a third shaft;
an electrical generator coupled to the gearbox; and
a mechanism, coupled to the second and third shafts, configured to adjust a relative angular displacement between the first and second rotors.

7. The adjustable dual rotor wind turbine of claim 6, wherein said mechanism configured to adjust the relative angular displacement between the first and second rotors comprises at least one clutch disc coupled to the third shaft, and a flywheel coupled to the second shaft.

8. The adjustable dual rotor wind turbine of claim 7, further comprising an actuation mechanism configured to engage and disengage the at least one clutch disc and the flywheel, wherein the first and second rotors are free to rotate relative to each other when the at least one clutch disc and the flywheel are disengaged; and wherein the first and second rotors are fixed relative to each other when the at least one clutch disc and the flywheel are engaged.

9. The adjustable dual rotor wind turbine of claim 6, wherein said mechanism is configured to adjust the relative angular displacement between the first and second rotors as a function of an output power measured from the electrical generator that was generated as a result of a combined rotation of the first and second rotors.

10. The adjustable dual rotor wind turbine of claim 8, wherein said actuation mechanism comprises a solenoid coupled to the clutch disc, wherein the adjustable dual rotor wind turbine includes a controller configured to signal the solenoid to be activated and deactivated according to a value of electrical output power produced by the wind turbine, wherein the value is measured by a power meter.

11. The adjustable dual rotor wind turbine of claim 6, further comprising an actuation mechanism configured to engage and disengage the first and second rotors from each other, wherein the first and second rotors are free to rotate relative to each other when the actuation mechanism is configured so that the first and second rotors are disengaged from each other, and wherein rotations of the first and second rotors are fixed relative to each other when the actuation mechanism is configured so that the first and second rotors are engaged with each other, wherein when the actuation mechanism is configured so that the first and second rotors are disengaged from each other, the relative angular displacement between the first and second rotors changes.

12. The adjustable dual rotor wind turbine of claim 6, wherein the first and second rotors are mounted on a housing assembly in a substantially collinear configuration pointing towards opposite directions from each other.

13. A control process configured to control operation of an adjustable dual rotor wind turbine, wherein the adjustable dual rotor wind turbine includes a first rotor with a first set of blades, a second rotor with a second set of blades, and an actuation mechanism configured to selectively engage and disengage the first and second rotors with each other, the control process comprising:

measuring an output power generated by a combined rotation of the first and second rotors when the first and second rotors are engaged with each other;

when the measured output power is less than a threshold power value, signaling the actuation mechanism to disengage the first and second rotors from each other for a period of time to allow a relative angular displacement between the first and second rotors to change; and     signaling the actuation mechanism to re-engage the first and second rotors with each other after the period of time.

14. The control process of claim 13, wherein said threshold power value is predetermined by a user.

15. The control process of claim 13, wherein said period of time is preselected by a user.

16. The control process of claim 13, further comprising repeating the measuring of the output power generated by the combined rotation of the first and second rotors when the first and second rotors are engaged with each other if the measured power is greater than the threshold power.

17. The control process of claim 13, wherein the first and second rotors are free to rotate relative to each other when the actuation mechanism is configured so that the first and second rotors are disengaged from each other, and wherein rotations of the first and second rotors are fixed relative to each other when the actuation mechanism is configured so that the first and second rotors are engaged with each other.

18. The control process of claim 17, wherein the first and second rotors are mounted on a housing assembly in a substantially collinear configuration pointing towards opposite directions from each other.

19. The control process of claim 13, further comprising signaling the actuation mechanism to engage the first and second rotors with each other before the measuring of the output power generated by the combined rotation of the first and second rotors.

\* \* \* \* \*